(No Model.)
J. S. SELLON.
SYSTEM OF ELECTRICAL DISTRIBUTION BY SECONDARY BATTERIES.
No. 378,115. Patented Feb. 21, 1888.
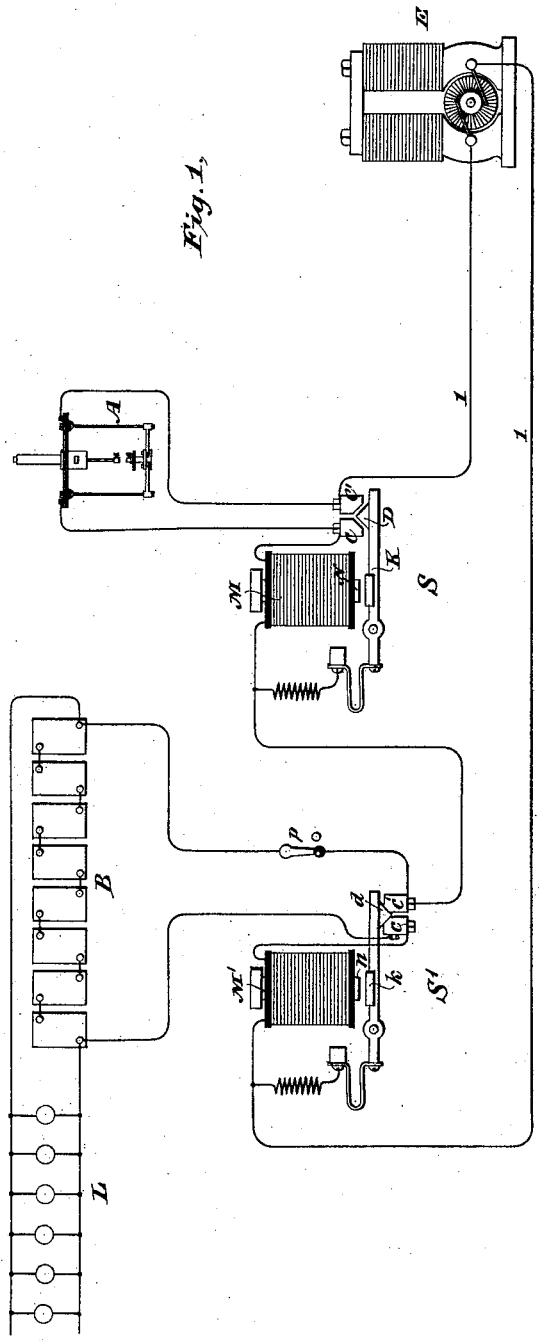
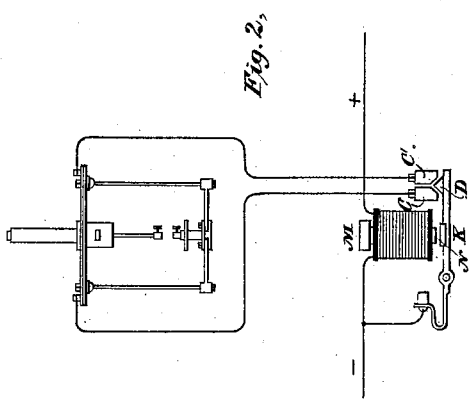
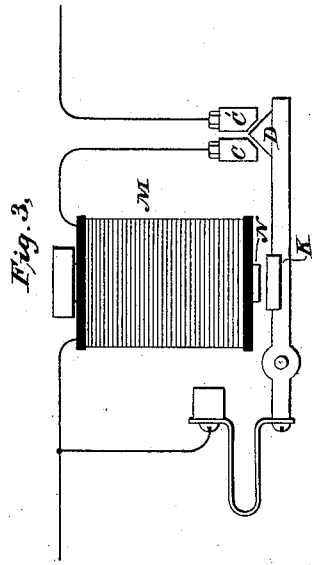
Witnesses
Geo. W. Breck
Carrie E. Ashley
Inventor
John S. Sellon
By his Attorney
Wm. B. Vansize

UNITED STATES PATENT OFFICE.

JOHN S. SELLON, OF HATTON GARDENS, COUNTY OF MIDDLESEX, ENGLAND, ASSIGNOR TO THE ELECTRICAL ACCUMULATOR COMPANY, OF NEW YORK.

SYSTEM OF ELECTRICAL DISTRIBUTION BY SECONDARY BATTERIES.

SPECIFICATION forming part of Letters Patent No. 378,115, dated February 21, 1888.

Application filed August 30, 1887. Serial No. 248,259. (No model.) Patented in England January 13, 1883, No. 217.

*To all whom it may concern:*

Be it known that I, JOHN SCUDAMORE SELLON, a subject of the Queen of Great Britain and Ireland, and a resident of Hatton Gardens, in the county of Middlesex, England, have invented certain new and useful Improvements in Systems of Electric Distribution by Accumulators, (for which I have obtained Letters Patent in Great Britain, No. 217, dated January 13, 1883,) of which the following is a specification.

My invention relates to an improvement in systems of electric distribution by accumulators.

In the present systems of central-station lighting a stoppage in the operation of the dynamo results in a failure of the lights. It is therefore of great advantage to place an apparatus for the storage of electrical energy at the stations where such energy is applied to the production of useful results, as in lighting. Storage-batteries may be applied in this way, and they may be charged during the day from a circuit supplied with electricity from a central station. Such circuit should carry a current of electricity adapted to charge the batteries in the most economical and satisfactory manner, and during the remaining hours the said circuit may be utilized to directly supply lamps or other translating devices with the necessary electrical energy furnished at a rate and under an electro-motive force calculated to best utilize the lamps or translating devices, although unfit for use in charging the batteries. For instance, I may supply a series of arc lamps directly with a ten-ampère current, and I may then remove the lamps and supply the batteries with a twenty-ampère current, or vice versa.

My invention consists of means for automatically producing this change from one arrangement to the other. We will consider the use of arc lamps and accumulators to be alternately supplied with electricity from the same circuit. Let the arc lamps take or absorb, say, ten ampères and the accumulators absorb much more—say twenty ampères—although the reverse may be the case.

I place the lamps and accumulators in the main circuit. With each lamp or series of lamps and with each cell or series of cells I place an electro-magnet in the circuit in series. Each magnet when operated makes and breaks a shunt or short circuit around its accompanying translating device, the lamps, or the battery. The magnet assigned to each lamp operates to cut said lamp out of circuit by a certain variation in current strength— say an increase to twenty ampères. The magnet assigned to each battery operates to cut said battery out of circuit by a certain variation in current strength—say a decrease to ten ampères—the result being that while a current of ten ampères is flowing in the circuit all lamps will be in and batteries out, and when a current of twenty ampères is flowing in said circuit all batteries will be in and lamps out. It may be arranged to produce the same changes in the translating devices by providing polarized electro-magnets and varying the polarity of current flowing in the main circuit to withdraw lamps and insert accumulators, and vice versa.

The accompanying drawings illustrate my invention.

Figure 1 shows a complete installation. Figs. 2 and 3 are detail views.

E is a primary generator, as a dynamo, located at a central station.

S and S' are sub stations upon the main circuit $l$. At S there is an arc lamp, A; at S' a secondary battery or accumulator, B, consisting of a series of cells sufficient in number to feed the translating devices, as incandescent lamps L, in the working-circuit. The lamp A and battery B are connected in series in circuit $l$; but one or the other is normally short-circuited by an electro-magnetic switch operated by variations in the electrical condition of said circuit.

Referring to Fig. 3, M is an electro-magnet, having a core, N, and a spring-retracted armature, K. C C' are two fixed contact-points, and D is a contact-point upon the free end of the armature-lever registering with the contact-points C C'. M' is of similar construction, except that its contact-points $c$ $c'$ and $d$ are in position to come together when the armature is in a retracted position, while M has its contact-points in position to come together when the armature is attracted. The main circuit is divided at each station, one end being connected to fixed contact C, the other end to fixed contact C'. At one station the terminals of the arc lamp are connected to C C'. At the other station the terminals of the battery are connected to c c'. The armature-bar of each electro-magnet is connected to the main circuit, and serves to reduce the resistance of the magnet by forming a shunt around it containing more or less resistance, as the case demands or admits of.

Magnet M is wound and adjusted to attract its armature when the current exceeds ten ampères, and magnet M' is adjusted to respond only to a current of twenty ampères, or thereabout—that is to say, the two classes of magnets should be adjusted to respond to wide variations in current strength. When no current is flowing in circuit $l$, the parts are in the position shown, and this position is maintained while the circuit carries a current of ten ampères or more and arc lamp A is operating, circuit being via E $l$ C' A C M to c', d, c, k, and M' jointly, returning by main conductor to E. If it now be desired to cut off current from lamp A and charge battery B, the current in circuit $l$ is increased to twenty ampères, or thereabout. Armatures K and k are now attracted and circuit passes from E, via $l$, C', D, C, K, and M to c' B c M', and return to E, so that while the lamp is in circuit the battery is cut out, and while the battery is in circuit the lamp is cut out.

Stations of either description may be added at pleasure, and both arrangements of apparatus may be located at one station.

What I claim, and desire to secure by Letters Patent, is—

1. The combination of a primary generator of electricity, a main circuit supplied with electricity thereby, a secondary battery and a different species of translating device fed from the main circuit, a working-circuit for the secondary battery containing a separate translating device, and a device for inserting and withdrawing the battery operated by changes in the current strength of the main circuit.

2. The combination of a primary generator of electricity, a main circuit supplied with electricity thereby, a secondary battery and a second species of translating device fed from the main circuit, a working-circuit for the secondary battery containing a separate translating device, and means for inserting and withdrawing said second species of translating device responsive to predetermined variations in the current strength of the main circuit.

3. The combination of a primary generator of electricity, a main circuit supplied with electricity thereby, a secondary battery and an arc light to be fed from the main circuit, a working-circuit for the secondary battery containing a third species of translating device, and two electro-magnets operated by variations of current strength in the main circuit for inserting the light and withdrawing the battery, and vice versa, with respect to the main circuit.

4. The combination of a primary generator of electricity and a main circuit therefor, a translating device and a secondary battery supplied with electricity from said circuit, a working-circuit for the secondary battery containing a separate translating device, and two electro-magnets in the main circuit, one responsive to a predetermined variation in current strength, the other responsive to a different and predetermined variation of current, and both operating to insert and withdraw the first-named translating device or the battery with respect to the main circuit.

5. The combination of a primary generator of electricity, a main circuit therefor, an arc light and a secondary battery supplied from said circuit, a working-circuit for said battery containing incandescent lamps, and a switch operated by variations of current strength in the main circuit to change the connection of said battery with respect to said circuit.

6. The combination of a primary generator of electricity, a main circuit to be supplied with electricity thereby, a translating device absorbing current at a predetermined rate, a second translating device absorbing current at a different and predetermined rate, an electro-magnetic switch to cut out the last-named translating device, operated by the current assigned to the first device, and an electro-magnetic switch to cut out the first-named device, operated by the current assigned to the second, substantially as described.

7. The combination of a dynamo-electric machine, a circuit supplied with electricity thereby, an electric-lighting device in said circuit, an electro-magnet operated by variations in the current of said circuit, two fixed contact-stops connected to the main circuit upon opposite sides of said electric-lighting device, and a movable contact controlled by the said electro-magnet to electrically connect the fixed contacts.

8. The combination of a dynamo-electric machine, a circuit supplied with electricity thereby, a secondary battery in said circuit, an electro-magnet operated by variations in the current of said circuit, two fixed contact-stops connected to the main circuit upon opposite sides of said secondary battery, and a movable contact controlled by the said electro-magnet to electrically connect said fixed contacts.

9. The combination of a dynamo-electric machine, a circuit supplied with electricity thereby, a secondary battery in said circuit, an electric-lighting device to be operated in said circuit, an electro-magnet for said battery, an electro-magnet for said lighting device, fixed contact-points connected to the main circuit upon opposite sides of the battery, fixed contact-points connected to the main circuit upon opposite sides of the lighting device, and movable contacts operated by the said magnets under the influence of variations in the current flowing in said circuit to electrically connect each pair of fixed contacts, respectively.

Signed at London, in the county of Middlesex, this 13th day of August, A. D. 1887.

JOHN S. SELLON.

Witnesses:
 JOHN NEWTON,
 WM. JOHN WEEKS,
*Both of 9 Birchin Lane, London.*